(12) United States Patent
Moutarlier

(10) Patent No.: US 7,280,554 B2
(45) Date of Patent: Oct. 9, 2007

(54) COMPUTER IMPLEMENTED METHOD FOR ASSIGNING A BACK-OFF INTERVAL TO AN INTERMEDIARY NETWORK ACCESS DEVICE

(75) Inventor: Philippe Moutarlier, Milton, MA (US)

(73) Assignee: 3Com Corporation, Marlborough, MA (US)

( * ) Notice: Subject to any disclaimer, the term of this patent is extended or adjusted under 35 U.S.C. 154(b) by 1029 days.

(21) Appl. No.: 10/201,876

(22) Filed: Jul. 23, 2002

(65) Prior Publication Data

US 2004/0028072 A1    Feb. 12, 2004

(51) Int. Cl.
*H04L 12/413* (2006.01)
*H04L 12/26* (2006.01)

(52) U.S. Cl. ............... 370/445; 370/254; 370/235

(58) Field of Classification Search ........ 370/229–235, 370/254, 256, 311–339, 428–449; 340/825.5
See application file for complete search history.

(56) References Cited

U.S. PATENT DOCUMENTS

| | | | |
|---|---|---|---|
| 4,979,168 A * | 12/1990 | Courtois et al. ............ 370/349 |
| 5,175,537 A * | 12/1992 | Jaffe et al. ................ 370/447 |
| 5,319,641 A * | 6/1994 | Fridrich et al. ............. 370/447 |
| 5,706,274 A * | 1/1998 | Angelico et al. ........... 370/445 |
| 6,418,136 B1 | 7/2002 | Naor et al. ................. 370/347 |
| 7,027,462 B2 * | 4/2006 | Benveniste ................. 370/447 |
| 7,095,754 B2 * | 8/2006 | Benveniste ................. 370/465 |

FOREIGN PATENT DOCUMENTS

EP    1 215 851 A2    6/2002

* cited by examiner

*Primary Examiner*—Afsar Qureshi

(57) ABSTRACT

In one embodiment, the present invention is a computer implemented method for assigning a back-off interval to an intermediary network access device in a Carrier Sense Multiple Access (CSMA) network. The number of client devices concurrently attempting to access said network via said intermediary network access device is first determined. The back-off interval is then determined based upon the number of client devices concurrently attempting to access the network via the intermediary network access device and is assigned to the intermediary network access device.

12 Claims, 4 Drawing Sheets

COMPUTER IMPLEMENTED METHOD FOR ASSIGNING A BACK-OFF INTERVAL TO AN INTERMEDIARY NETWORK ACCESS DEVICE

FIELD OF THE INVENTION

The present invention relates to the field of networked communications devices. More specifically, embodiments of the present invention are directed to a method for assigning a back-off interval to an intermediary network access device.

BACKGROUND OF THE INVENTION

Carrier Sense Multiple Access (CSMA) is a network access method which is frequently used in state of the art computer networks. CSMA methods for conflict resolution are based upon a system in which each conflicting device randomly draws a "back-off" interval within a time period known as a contention window. In a collision detection method, this back-off interval is the time period each conflicting device will wait after the detection of a transmission collision before attempting to access the network medium again. Thus, the device which draws the shortest back-off interval will be the first device to access the network medium after the collision. In a collision avoidance method, the back-off interval is the time period a device will wait after the detection of network activity before attempting to transmit.

Currently, CSMA methods use a uniform distribution of probability to assign a back-off interval to each device directly accessing the network medium. This means that each device accessing the network medium has an equal chance of drawing the lowest back-off interval. However, it can happen that one direct access device accesses the network medium as an intermediary for multiple indirect access devices. In such an instance, even though the intermediary access device is acting on behalf of multiple indirect devices, it still competes with other direct access devices on the network as if it were a single, direct access device. Consequently, devices indirectly connected to the network via these intermediary access devices do not have equitable opportunity to access to the network medium compared to other devices directly accessing the network. This is a problem in wireless or Radio Frequency (RF) networks due the limited available bandwidth and especially in networks using two or more wireless workgroup bridges to link LANs together.

As an example, in a CSMA network with 2 competing direct access devices, each device has a 50% chance of drawing the shortest back-off interval because each device uses the same uniform distribution of probability. The direct access device which draws the shortest back-off interval will be the next to access the network after the back-off interval expires. This is expressed mathematically as:

$$P=1/D$$

where P is the probability of drawing the shortest back-off interval and D is the number of direct access devices attempting to access the network. In the example of 2 direct access devices, the probability is 1/2 that a given device will draw the shortest back-off interval.

If one of the direct access devices is acting as an intermediary network access for N indirect access devices, the number of competing devices is actually 4 (the direct access device and the 3 indirect access devices). Therefore, in this situation, the probability should be:

$$P=(D+N)-1.$$

Because the intermediary network access device is not attempting to access the network on its own behalf, but is acting on behalf of the N indirect access devices, it should not be a factor in determining the distribution of probability. Therefore, each competing device should actually have a 1/4 probability of drawing the shortest back-off interval. However, due to the uniform distribution of probability being applied to the direct access devices only, each direct access device still gets a 1/2 probability of accessing the network next. Thus, the direct access device has a 1/2 probability accessing the network next while each of the 3 indirect access devices only gets a 1/6 probability of accessing the network next. This discrepancy in network access opportunity increases with the number of direct or indirect access devices in the network.

Therefore, prior art methods for assigning a back-off interval to an intermediary network access device are disadvantageous because they do not give the indirect access devices coupled to it equitable access opportunity to a CSMA network. Specifically, the uniform distribution of probability used to assign back-off intervals does not account for a plurality of multiple indirect access devices which may be competing with direct access devices for network access via an intermediary device. This is problematic because it slows communications for devices which attempt to access a CSMA network via an intermediary device.

SUMMARY OF THE INVENTION

Embodiments of the present invention are directed to a method for assigning a back-off interval to an intermediary network access device which gives the indirect access devices equitable access opportunity to a CSMA network medium. Specifically, embodiments of the present invention utilize a non-uniform distribution of probability to assign a back-off interval to direct access devices which are acting as intermediaries for multiple indirect access devices. The non-uniform distribution of probability accounts for the plurality of multiple indirect access devices when assigning a back-off interval to the intermediary device.

In one embodiment, the present invention is a computer implemented method for assigning a back-off interval to an intermediary access device in a Carrier Sense Multiple Access (CSMA) network. The number of client devices concurrently attempting to access said network via said intermediary access device is first determined. The back-off interval is then determined based upon the number of client devices concurrently attempting to access said network.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to embodiments of the present invention, examples of which are illustrated in the accompanying drawings. While the present invention will be described in conjunction with these embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 1:
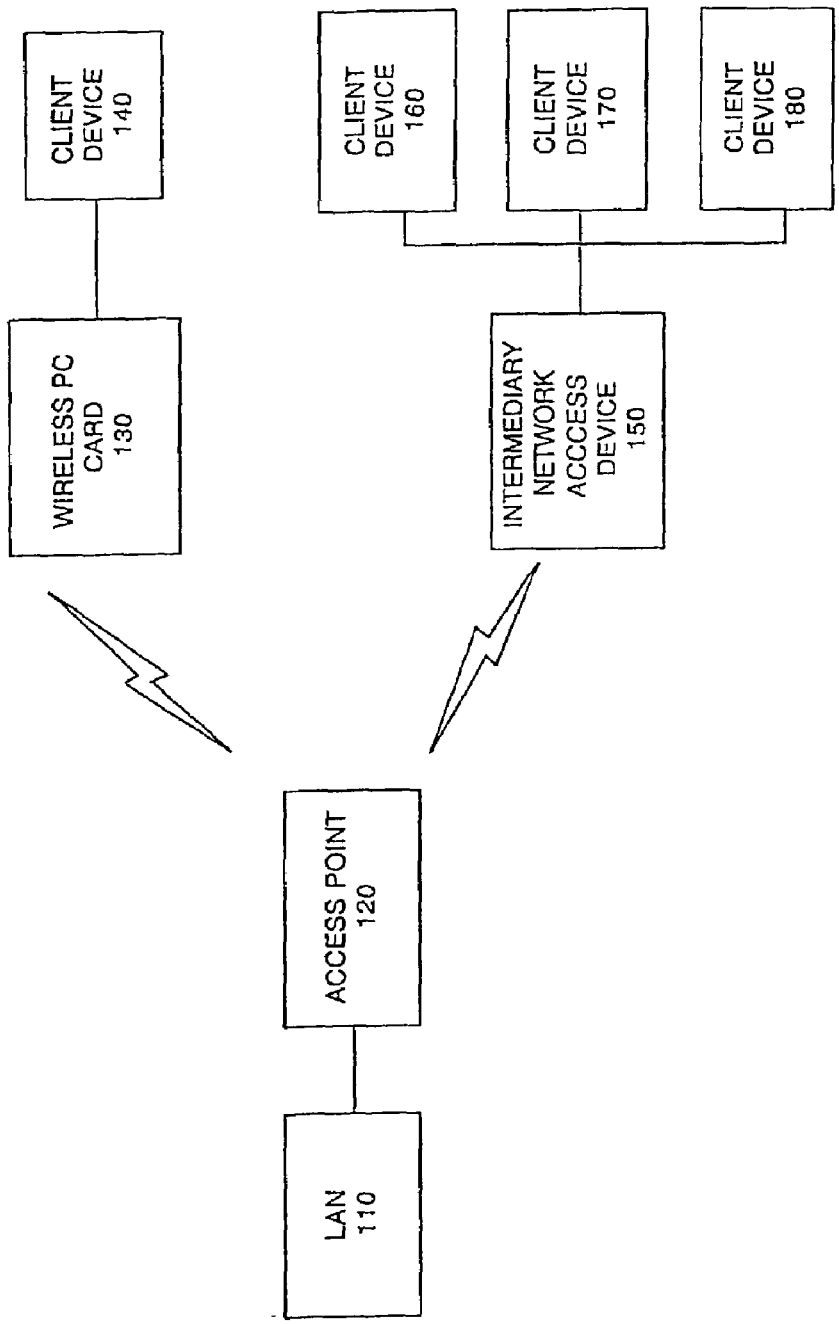
FIG. 1 is a block diagram of an exemplary CSMA network upon which embodiments of the present invention may be utilized.

FIG. 1 is a block diagram of an exemplary CSMA network 100 upon which embodiments of the present invention may be utilized. In accordance with embodiments of the present invention, network 100 may be a wireless Radio Frequency network. In FIG. 1, a LAN 110 is wirelessly coupled with wireless PC card 130 and intermediary access device 150 via access point 120. Wireless PC card 130 is, for example, a wireless networking card coupled with a personal computer system. In one embodiment, intermediary network access device 150 is a wireless workgroup bridge. Access point 120, wireless PC card 130, and intermediary access device 150 are considered direct access devices because they directly access the network medium (e.g., wireless RF transmissions). Additionally, clients 160, 170, and 180 are coupled to the network medium via intermediary network access device 150. Clients 160, 170, and 180 are considered indirect access devices because they do not directly access the network medium, but instead rely on intermediary access device 150 to act on their behalf. In other words, intermediary network access device 150 provides wireless access to network 100 for multiple Ethernet devices (e.g., client devices 160, 170, and 180).

Embodiments of the present invention are directed to a method for assigning a back-off interval to an intermediary network access device (e.g., intermediary network access device 150). In accordance with embodiments of the present invention, a non-uniform distribution of probability is utilized for intermediary network access devices (e.g., device 150) which are attempting to access a CSMA network on behalf of multiple client devices. In other words, the greater the number of indirect access devices competing for network access via device 150, the greater the chance that device 150 will draw the shortest back-off interval. It is appreciated that the method of the present invention may be utilized on access point 120 as well when multiple clients on LAN 110 utilize access point 120 as an intermediary access device for access on network 100.

Referring to FIG. 1, if clients 140, 160, 170, and 180 are simultaneously competing for network access, intermediary network access device 150 will use a distribution of probability which gives it a greater probability of accessing the network than a single direct access device would have. In so doing, the present invention provides indirect access devices (e.g., clients 160, 170, and 180) a more equitable opportunity for network access as competing direct access devices (e.g., client 140).

Typically, one of two methods is used for exchanging data between access point 120 and intermediary network access device 150. Traditionally, a data frame from a client device (e.g., client device 160) is encapsulated within a second data frame before being sent from intermediary network access device 150. The process is reversed when access point 120 receives the data in a process called decapsulation. After decapsulation, the original data frame from client 160 is transmitted on LAN 110. However, the second data frame contains the MAC address of intermediary network access device 150 in its header rather than the MAC address of client device 160. Thus, from the perspective of access point 120, the data frame is coming from intermediary network access device 150. This can lead to significant delays in transmission as the frames must be encapsulated/decapsulated and the larger frames take longer to transmit.

In the other method for exchanging data, the frame of data from client device 160 is not encapsulated in a second frame of data by intermediary network access device 150. Thus, from the perspective of access point 120, client device 160 is treated as a separate physical wireless station. However, in actuality, client device 160, as well as client devices 170 and 180, are virtual wireless stations that communicate through a single physical wireless station (e.g., intermediary network access device 150). Embodiments of the present invention can be utilized in networks using either of the above mentioned methods for exchanging data in order to provide more equitable network access for multiple competing indirect access devices.

Figure 2:
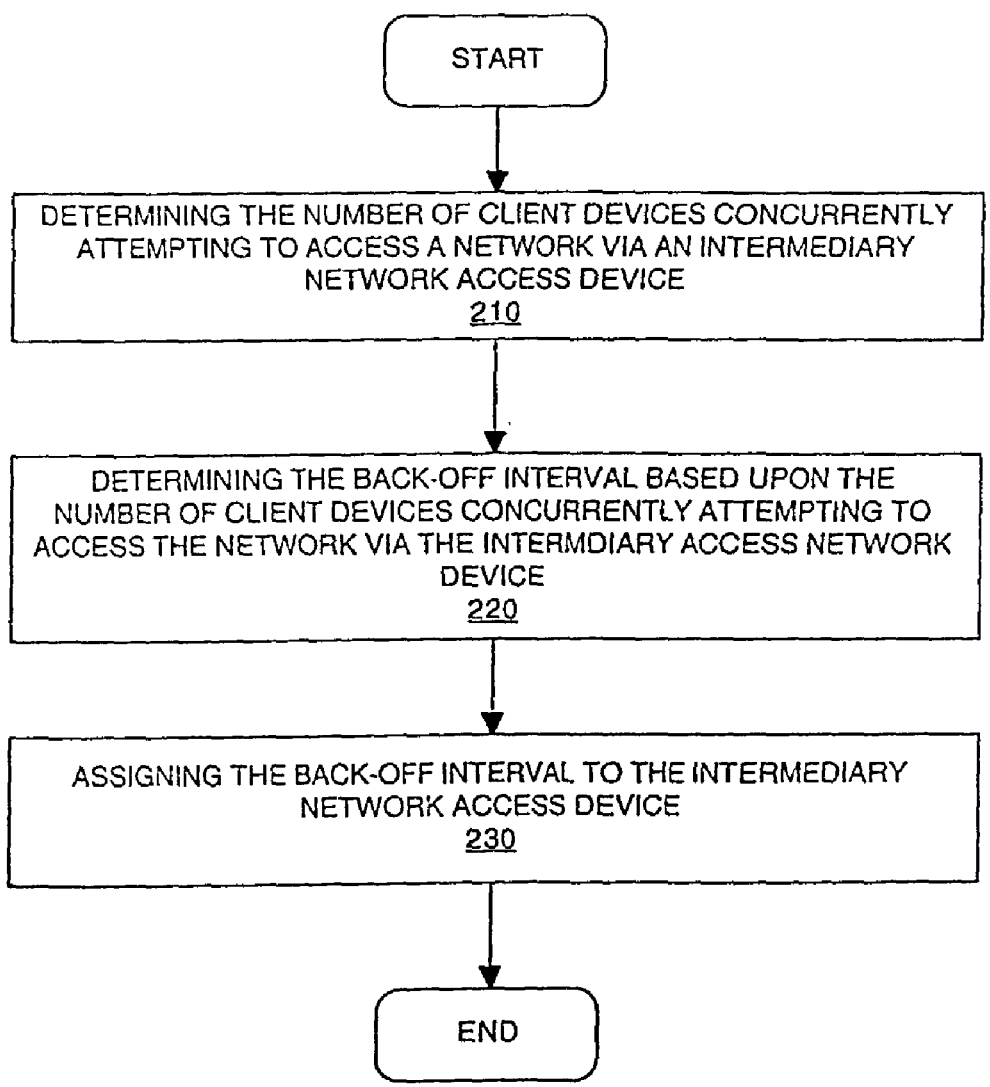
FIG. 2 is a flow chart of a computer implemented method for assigning a back-off interval to an intermediary network access device in accordance with embodiments of the present invention.

FIG. 2 is a flow chart of a computer implemented method for assigning a back-off interval to an intermediary network access device in accordance with embodiments of the present invention. For clarity, the following discussion will utilize the block diagram of FIG. 1 in conjunction with flow chart 200 of FIG. 2, to clearly describe one embodiment of the present invention.

In step 210 of FIG. 2, a number of client devices concurrently attempting to access a network via an intermediary network access device is determined. Referring to FIG. 1, the number of client devices (e.g., clients 160, 170, and 180) which are attempting to access network 100 via intermediary network access device 150 is determined. In one embodiment of the present invention, determining the number of client devices (e.g., clients 170, 180, and 180 of FIG. 1) comprises determining the number of clients in the transmit queue of intermediary network access device 150. However, while the present embodiment recites determining the number of clients in the transmit queue of the intermediary device 150, the method of the present invention is well suited to utilize other methods for determining the number of client devices attempting to concurrently access the network.

In step 220 of FIG. 2, the back-off interval is determined based upon the number of client devices concurrently attempting to access the network. In accordance with embodiments of the present invention, a non-uniform distribution of probability is used to determine the back-off interval for intermediary network access device 150. When a uniform distribution of probability is used on each competing direct access device, each competing direct access device has an equal chance of drawing the shortest back-off interval. As described above, this puts indirect access devices at a disadvantage when competing with direct access devices for network access. However, the present invention facilitates assigning a greater distribution of probability to intermediary network access devices based upon how many indirect access devices are competing for network access. Specifically, when a higher number of indirect access devices simultaneously compete for network access via intermediary network access device 150, the probability of drawing a shorter back-off interval for intermediary network access device 150 increases.

In step 230 of FIG. 2, the back-off interval is assigned to the intermediary network access device. The back-off interval determined in step 220 is assigned to the intermediary network access device. In so doing, the present invention assigns a back-off interval which is based upon the number of client devices which are simultaneously attempting to access the network. Thus, embodiments of the present invention give multiple indirect access devices a more equitable opportunity for network access.

Figure 3:
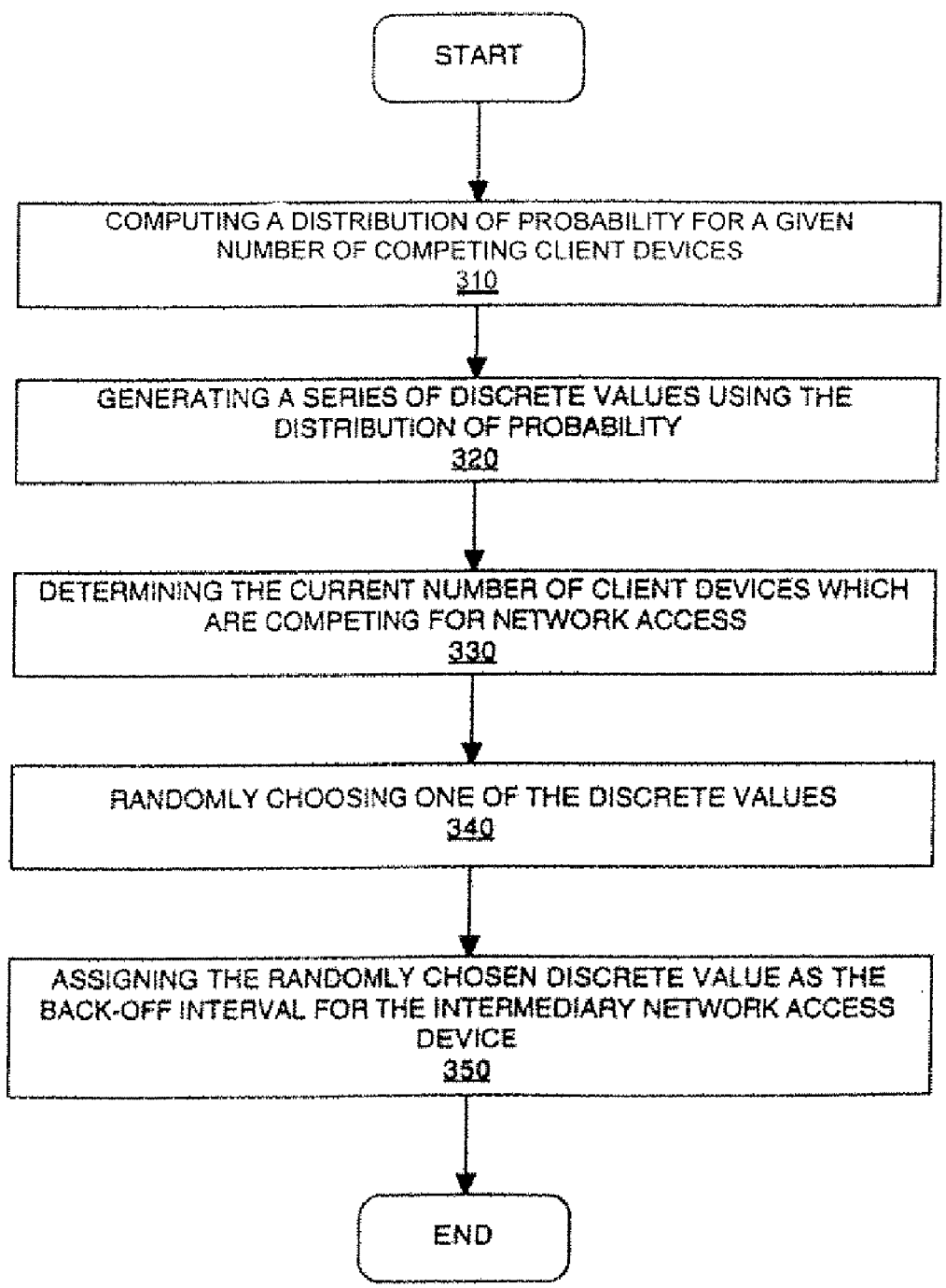
FIG. 3 is a flow chart, describing in greater detail, a method for drawing a non-uniform random back-off interval in accordance with embodiments of the present invention.

FIG. 3 is a flow chart, describing in greater detail, a method for drawing a non-uniform random back-off interval in accordance with embodiments of the present invention.

In step 310 of FIG. 3, a distribution of probability for various numbers of competing client devices is computed. In the following discussion, a formula for computing a distribution of probability is recited. While the present embodiment recites using the following formula, the present invention is well suited to utilize a variety of probability formulas in this step. The following formula computes the probability of choosing a particular minimum value which is expressed as P(MV=T).

In one embodiment of the present invention, the probability of obtaining a value within a non-empty interval in a continuous space is computed rather than trying to obtain a single value. For this reason, the problem is formulated as the probability that the minimum value picked by M machines belongs to an interval [t ... t+h] where h is any positive number such that [t+h] is less than the contention window. Controlling the value h will then allow choosing the time slot resolution. Therefore, the minimum value (MV) from M independent draws belongs to a given interval [t ... t+h]. The value M represents the number of draws the indirect access devices would have if they were allowed to draw a back-off interval independently.

This value can be described as the conjunction of two separate events:
Event A: there is no value belonging to [0 ... t], and
Event B: knowing A, there is at least one value belonging to [t ... t+h]

Using the multiplication rule, the following equation is used:

$$P(A \cap B) = P(A) \times P(B|A).$$

In order to compute P(A) and P(B|A), the assumption is first made that the number drawn by 1 device belongs to a continuous space. The density of probability of this number is then:

$$f(x) = \frac{1}{CW} \text{ if } x \in [0 \ldots CW]$$

The probability that a value belongs to a given interval [a ... b] is then:

$$P(x \in [a \ldots b]) = \frac{b-a}{CW}$$

If M devices are drawing independently, the probability that all values belong to an interval [a ... b] is:

$$P\left(\bigcap_{j=1}^{M} x_j \in [a \ldots b]\right) = \frac{(b-a)^M}{CW^M}$$

If MV is the minimum value being generated, this means that no value belongs to [0 ... t]. This is equivalent to saying that all values belong to [t ... CW]. The probability of Event A is then:

$$P(A) = \frac{(CW-t)^M}{CW^M}$$

However, if MV exists, that also means that at least one value belongs to [t ... t+h]. Since MV belongs to [t ... CW], the probability of B knowing A is then the complement to 1 of the probability of having all values from [t ... CW] belonging to [t+h ... CW]:

$$P(B|A) = 1 - \frac{(CW-t-h)^M}{(CW-t)^M}$$

Substituting these values in the formula P(A∩B)=P(A)×P(B|A), the result is:

$$P(A \cap B) = P(A) \times P(B|A) = \frac{(CW-t)^M - (CW-t-h)^M}{CW^M}$$

Discrete values can then be computed by choosing h=1, where T is an integer belonging to [0 ... CW−1], the final formula is:

$$P(MV=T) = \frac{(CW-T)^M - (CW-T-1)^M}{CW^M}$$

As an example, for 2 clients (e.g., client 160 and 170 of FIG. 1) drawing integer numbers d1 and d2 with values of 0, 1, 2, and 3. There are 16 different (d1,d2) pairs of numbers having 0, 1, 2, or 3 as their minimal value. Of these 16 pairs, 7 have a 0 in them:
(0,0), (0,1), (0,2), (0,3), (1,0), (2,0), and (3,0) leading to 7/16 chances to get a minimum value (MV) of 0.

Within the remaining 9 pairs, 5 have the value 1 in them: (1,1), (1,2), (1,3), (2,1), and (3,1) leading to 5/16 chance to get a minimum value of 1.

Within the next 4 pairs, 3 have the value 2 in them: (2,2), (2,3), and (3,2) leading to a 3/16 chance to get a minimum value of 2.

Finally, there is only one chance of getting a pair with only 3 in it: (3,3).

This can be obtained from the formula:

$$P(MV=T) = \frac{(CW-T)^M - (CW-T-1)^M}{CW^M}$$

by setting CW=4, M=2, and T=(1, 2, 3, or 4).

$P(MV)=0=(4-0)^2-(4-1)^2/4^2=(16-9)/16=7/16$ $P(MV)=1=(4-1)^2-(4-2)^2/4^2=(19-4)/16=7/16$ $P(MV)=2=(4-2)^2-(4-3)^2/4^2=(4-1)/16=3/16$ $P(MV)=3=(4-3)^2-(4-4)^2/4^2=(1-0)/16=1/16$

From the above example, it is can be seen that for a larger group (M) of intermediary access devices, the probability of drawing the longest minimum back-off interval decreases. Additionally, given a larger group of intermediary access devices, the probability of drawing the shortest minimum back-off interval increases. Thus, the present invention, by providing a non-uniform distribution of probability, increases the probability that intermediary network access device will draw a shorter back-off interval.

Figure 4:
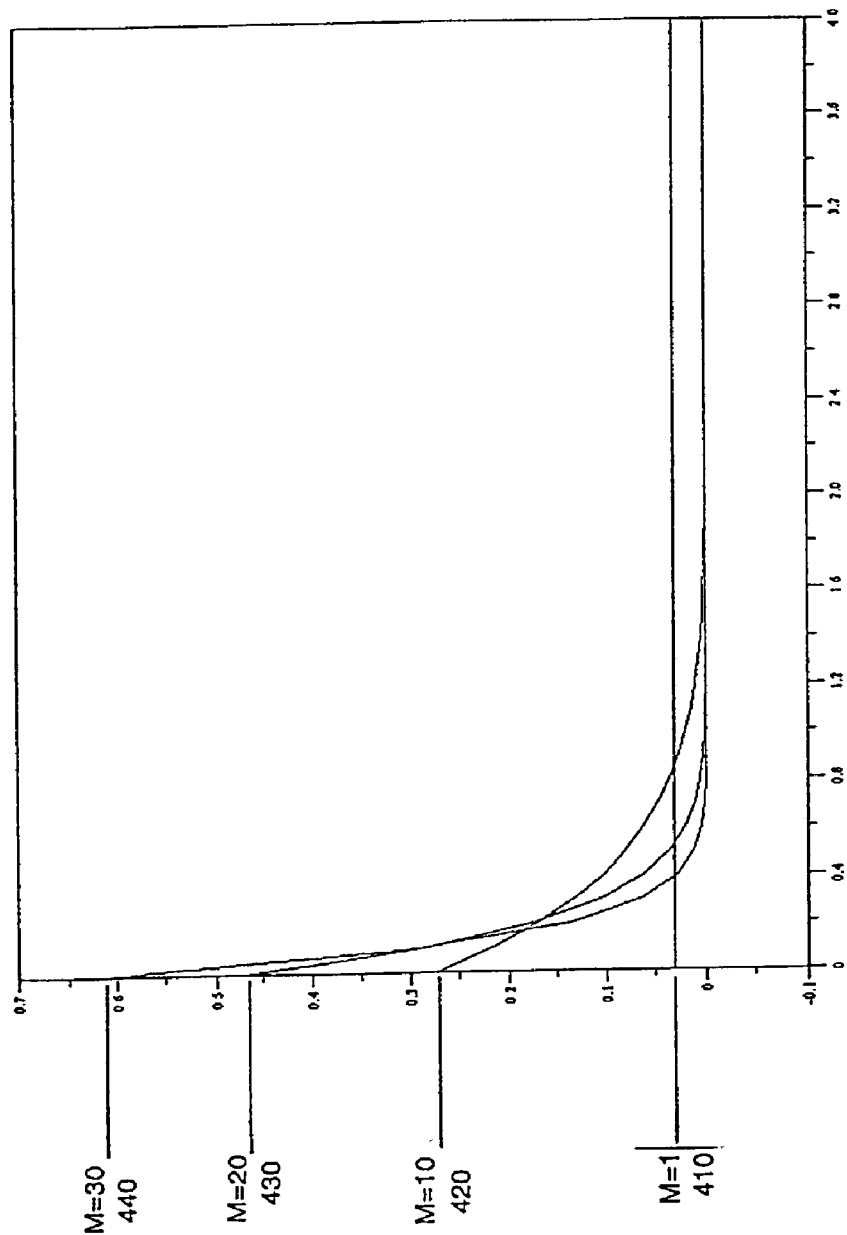
FIG. 4 is a graph showing exemplary probability distributions for 1, 10, 20, and 30 client devices computed in accordance with embodiments of the present invention.

FIG. 4 is a graph showing exemplary probability distributions for 1 client device (410), 10 client devices (420), 20 client devices (430), and 30 client devices (440) computed in accordance with embodiments of the present invention. The vertical "P" axis shows the probability that the corresponding value on the horizontal "T" axis will be the minimum back-off interval for n devices. The shape of the probability distributions is shown for 1, 10, 20, and 30 client devices. For 1 device, there is a uniform distribution of probability. As the number of client devices increases, the probability of drawing a shorter back-off interval increases. However, there is a practical limit due to the shape of the distribution of probability.

As shown in FIG. 4, 20 clients will draw a back-off interval in the first ⅛th of the contention window with a probability of 95%; 30 clients have a 99% probability for the same range of back-off intervals. Therefore, increasing the number of client devices beyond 30 client devices is unlikely to significantly increase the probability of drawing a shorter back-off interval. Thus, in one embodiment of the present invention, the maximum number of client devices using a given intermediary network access device is set to about 30.

In step 320 of FIG. 3, the distribution of probability is used to generate a series of discrete values. The numbers in each sub-table will have essentially the same probabilistic characteristics as distribution of probability for a given number of client devices. In one embodiment, for each possible number of client devices, a table of 32 discrete values is generated. This leads to a total of 32×30 values in the table. In one embodiment, for each value M of the number of client devices, the table is ordered by increasing values of the final discrete value:

$T[0,M]=P(R=0|M)$, $T[1|M]=T[0,M]+P(R=1M)$ . . . $T[j, M]=T[j-1, M]$, etc.

In step 330 of FIG. 3, a current number of client devices (M) which are competing for network access via a intermediary network access device is determined. As described above, in one embodiment, the current number of client devices is the number of client devices in the transmit queue of intermediary network access device 150. Typically, the actual number of client devices competing for network access will be less than the total number of clients coupled with intermediary network access device 150. Therefore, it is necessary to accurately reflect only the clients actually trying to access the network. In one embodiment, this is done by determining the number of clients in the transmit queue of intermediary network access device 150.

In step 340 of FIG. 3, one of the discrete values from step 330 is randomly chosen. Once the current number of client devices (M) has been determined, a back-off interval is chosen from the corresponding sub-table of the table described in step 320. For example, if 10 client devices are simultaneously competing to access the network via intermediary network access device 150, a sub-table having discrete values with a distribution of probability similar to distribution 420 of FIG. 4 is used. If 30 client devices are simultaneously competing to access the network via intermediary network access device 150, a sub-table having discrete values with a distribution of probability similar to distribution 440 of FIG. 4 is used.

Embodiments of the present invention utilize a random number generator to randomly choose one of the discrete values in the sub-table which corresponds to the number of client devices competing for network access. The random number generator will first draw a number "UR" using a uniform distribution of probability between 0 and $2^{16}$. This number UR will be searched within the sub-table with the condition:

$R=j$ if $T[j-1, M]<UR<=T[j, M]$ with $T[j-1, M]=0$ for $j=0$.

In step 350 of FIG. 3, the randomly chosen discrete value of step 340 is assigned to intermediary network access device 150 as the back-off interval. Thus, a back-off interval is assigned which gives intermediary network access device 150 a greater probability of drawing a shorter back-off interval than competing individual direct access devices. This provides a more equitable opportunity for client devices which are competing to access a network via intermediary network access device 150.

The preferred embodiment of the present invention, a computer implemented method for assigning a back-off interval to an intermediary network access device, is thus described. While the present invention has been described in particular embodiments, it should be appreciated that the present invention should not be construed as limited by such embodiments, but rather construed according to the following claims.

What is claimed is:

1. In a Carrier Sense Multiple Access (CSMA) network, a computer implemented method for assigning a back-off interval to an intermediary network access device comprising:

determining a number of client devices concurrently attempting to access said network via said intermediary network access device; and determining said back-off interval based upon said number of client devices concurrently attempting to access said network via said intermediary network access device; calculating a distribution of probability in which said back-off interval is inversely proportional to said number of client devices concurrently attempting to access said network via said intermediary network access device; and assigning said back-off interval to said intermediary network access device.

2. The method for assigning a back-off interval to an intermediary network access device as recited in claim 1, wherein said determining of said number of client devices comprises determining a number of said client devices which are currently in said intermediary network access device's transmit queue.

3. The method for assigning a back-off interval to an intermediary network access device as recited in claim 1, wherein said determining of said back-off interval further comprises generating a series of discrete values based upon said distribution of probability.

4. The method for assigning a back-off interval to an intermediary network access device as recited in claim 3, wherein said determining of said back-off interval further comprises randomly choosing one of said discrete values and designating it as said back-off interval for said intermediary network access device.

5. The method for assigning a back-off interval to an intermediary network access device as recited in claim 1, wherein said Carrier Sense Multiple Access network is a wireless Radio Frequency (RE) network and comprising determining said back-off interval based upon said number of client devices concurrently attempting to access said wireless Radio Frequency network via said intermediary network access device.

6. A method for generating a minimum back-off interval for a plurality of client devices attempting simultaneous communications via an intermediary network access device coupled with a Carrier Sense Multiple Access network comprising:

determining a number of competing devices which are attempting simultaneous communications via said intermediary access device;

computing a non-uniform Distribution of probability wherein a probability of a given minimum back-off interval is inversely proportional to said number of competing devices;

utilizing a Random Number Generator to choose said back-off interval from a series of discrete numbers having substantially the same probabilistic characteristics as said non-uniform Distribution of probability; and assigning said back-off interval to said intermediary network access device.

7. The method for generating a minimum back-off interval for a plurality of client devices as recited in claim 6 wherein said Carrier Sense Multiple Access network is a wireless Radio Frequency (RF) network and comprising determining a number of competing devices which are attempting simultaneous communications with said wireless Radio Frequency network via said intermediary network access device.

8. The method for generating a minimum back-off interval for a plurality of client devices as recited in claim 6, wherein said determining of said number of competing devices comprises determining a number of said plurality of said client devices in said intermediary network access device's transmit queue.

9. The method for generating a minimum back-off interval for a plurality of client devices as recited in claim 6, further comprising computing a unique non-uniform Distribution of probability for each value of said number of competing devices.

10. On an intermediary access device communicatively coupling a plurality of client devices with a Carrier Sense Multiple Access (CSMA) network medium, a method for determining a back-off interval for said intermediary network access device comprising:

determining a current number of client devices currently competing for said CSMA network medium via said intermediary network access device;

computing a Distribution of probability for said current number of client devices wherein the length of said back-off interval is inversely proportional to said current number of client devices; and utilizing said Distribution of probability to generate a series of discrete values and randomly designating one of said discrete values to be said back-off interval for said intermediary network access device.

11. The method for determining a back-off interval for intermediary network access device as recited in claim 10, wherein said determining comprises determining a number of client devices in said intermediary network access device's transmit queue.

12. The method for determining a back-off interval for said intermediary network access device as recited in claim 10, wherein said network medium is a wireless Radio Frequency network medium and comprising determining said current number of client devices currently competing for said wireless Radio Frequency network medium.

* * * * *